(12) United States Patent
Saracco et al.

(10) Patent No.: US 11,579,427 B2
(45) Date of Patent: Feb. 14, 2023

(54) METHOD AND APPARATUS FOR FILTERING AND FILTERED LIGHT DETECTION

(71) Applicant: Microvision, Inc., Redmond, WA (US)

(72) Inventors: Matthieu Saracco, Redmond, WA (US); Alga Lloyd Nothern, III, Seattle, WA (US); P. Selvan Viswanathan, Bellevue, WA (US); James P. McGuire, Pasadena, CA (US)

(73) Assignee: Microvision, Inc., Redmond, WA (US)

( * ) Notice: Subject to any disclaimer, the term of this patent is extended or adjusted under 35 U.S.C. 154(b) by 1158 days.

(21) Appl. No.: 16/160,167

(22) Filed: Oct. 15, 2018

(65) Prior Publication Data
US 2020/0116986 A1 Apr. 16, 2020

(51) Int. Cl.
| | | |
|---|---|---|
| *G02B 19/00* | (2006.01) | |
| *G02B 27/09* | (2006.01) | |
| *G02B 5/28* | (2006.01) | |
| *G01S 7/481* | (2006.01) | |

(Continued)

(52) U.S. Cl.
CPC .......... *G02B 19/009* (2013.01); *G01S 7/4816* (2013.01); *G01S 17/10* (2013.01); *G02B 5/281* (2013.01); *G02B 19/0019* (2013.01); *G02B 19/0052* (2013.01); *G02B 27/0983* (2013.01); *G01S 17/88* (2013.01); *G02B 5/288* (2013.01)

(58) Field of Classification Search
CPC .......... G01S 17/42; G01S 17/04; G01S 17/08; G01S 7/4802; G01S 7/4808; G01S 17/10; G01S 17/88; G01S 17/89; G01S 7/4815; G01S 7/4816; G01N 15/0205; A61K 31/38; A61K 31/395; A61K 31/40; A61K 31/415; A61K 31/445; A61K 31/47; A61K 31/55; C07D 209/42; C07D 405/12; C07D 409/12; C07D 413/04; C07D 413/10; C07D 455/02; C07D 401/06; A61P 1/00; A61P 13/02; A61P 43/00; A61P 9/06; G02B 19/0019; G02B 19/0052; G02B 19/0076; G02B 19/009; G02B 26/0833; G02B 26/101; G02B 27/0983; G02B 5/281; G02B 5/288
See application file for complete search history.

(56) References Cited

U.S. PATENT DOCUMENTS

| | | | | |
|---|---|---|---|---|
| 5,774,278 A | * | 6/1998 | Kaplan | G02B 5/20 359/885 |
| 2011/0279901 A1 | * | 11/2011 | Watanabe | G02B 5/285 359/589 |

(Continued)

OTHER PUBLICATIONS

Winston, et al., "Nonimaging Optics", Elsevier Academic Press, U.S. Appl. No. 01/012005, 50-52, 64.

*Primary Examiner* — Joseph P Martinez
*Assistant Examiner* — Vipin Patel
(74) *Attorney, Agent, or Firm* — Kevin D. Wills (57) ABSTRACT

A non-imaging concentrator is employed in an upside down configuration in which light enters a smaller aperture and exits a larger aperture. The input angle of light rays may be as large as 180 degrees, while the maximum exit angle is limited to the acceptance angle of the non-imaging concentrator. A dichroic filter placed at the larger aperture has a maximum angle of incidence equal to the acceptance angle of the non-imaging concentrator.

11 Claims, 7 Drawing Sheets

(51) Int. Cl.
*G01S 17/10* (2020.01)
*G01S 17/88* (2006.01)

(56) References Cited

U.S. PATENT DOCUMENTS

2011/0314937 A1* 12/2011 Johnson ............. G01N 15/0272
73/863.22
2017/0242108 A1* 8/2017 Dussan ................. G01S 7/4868

* cited by examiner

METHOD AND APPARATUS FOR FILTERING AND FILTERED LIGHT DETECTION

FIELD

The present invention relates generally to light detection and ranging systems, and more specifically to collecting light in light detection and ranging systems.

BACKGROUND

Figure 1:
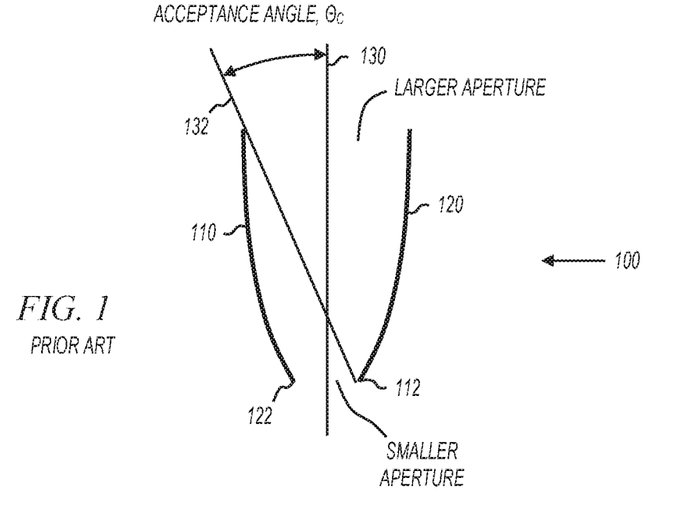
FIGS. 1-3 show cross sections of prior art compound parabolic concentrators.
Figure 2:
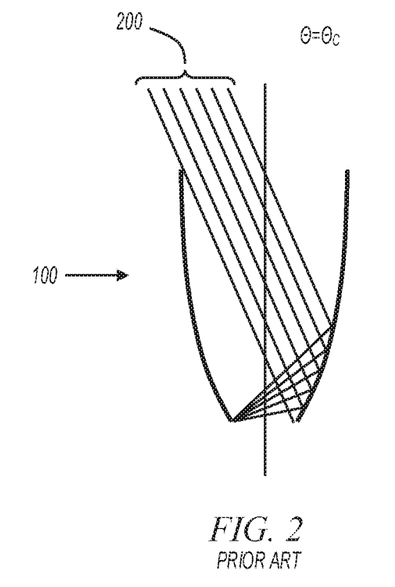
Figure 3:
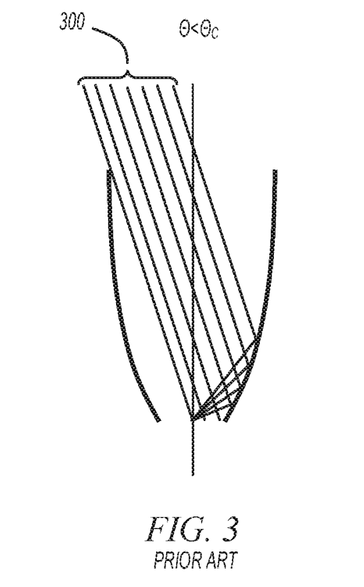

FIGS. 1-3 show cross sections of prior art non-imaging optics called compound parabolic concentrators (CPC). Each side of CPC 100 is in the shape of a parabola, and each of the parabolas has its focus at the lower edge of the other parabola. For example, point 122 is the focus of parabola 120, and point 112 is the focus of parabola 110. Compound parabolic concentrators have two apertures. The first aperture is formed between the two foci and is the smaller of the two apertures. The second aperture is formed on the opposite end of the CPC and is the larger of the two apertures.

Compound parabolic concentrators are well known. In its simplest form, a compound parabolic concentrator is a substantially off-axis rotated parabola and is defined using multiple parameters, one of which is referred to herein as the "acceptance angle," or "$\theta_c$." The acceptance angle is the angle between the axis 130 of the CPC and the line 132 connecting the focus of one of the parabolas with the opposite edge of the larger aperture. Light rays entering the larger aperture at an angle equal to or smaller than the acceptance angle reach the smaller aperture. FIG. 2 shows light rays 200 entering the larger aperture at an angle $\theta$ equal to the acceptance angle $\theta_c$, and FIG. 3 shows light rays 300 entering the larger aperture at an angle $\theta$ less than the acceptance angle $\theta_c$.

Light rays that enter the larger aperture at angles greater than the acceptance angle are reflected and returned back out the larger aperture. This is a well known property of compound parabolic concentrators.

As shown in FIGS. 1-3, CPCs are typically used to "concentrate" light entering the larger aperture into a smaller cross sectional area (the smaller aperture).

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 4:
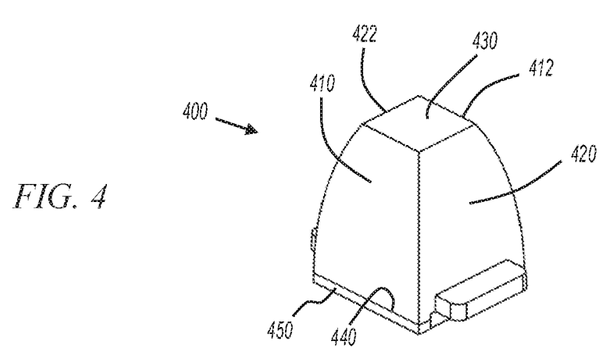
FIG. 4 shows a perspective view of a light sensitive apparatus in accordance with various embodiments of the present invention.

FIG. 4 shows a perspective view of a light sensitive apparatus in accordance with various embodiments of the present invention. The light sensitive apparatus shown in FIG. 4 includes CPC 400 and photodetector device 450. Compound parabolic concentrator 400 shown in FIG. 4 is a subset of the broader class of CPCs and is termed an "RCPC," or rectangular compound parabolic concentrator. Compound parabolic concentrator 400 includes a first pair of parabolic surfaces 410, 412 and a second pair of parabolic surfaces 420, 422. Compound parabolic concentrator 400 also includes first aperture 430 and second aperture 440, where first aperture 430 has a smaller cross sectional area than second aperture 440.

Compound parabolic concentrator 400 is referred to herein as "upside down" because it is oriented such that light enters the smaller aperture 430 and exits larger aperture 440. This is in contrast to the "right side up" orientation shown in FIGS. 1-3 where light enters the larger aperture and exits the smaller aperture.

In some embodiments, CPC 400 is hollow with reflective sides. In other embodiments, CPC 400 is made of a solid material such as plastic or glass and functions on the principle of total internal reflection (TIR) to guide the light from the input aperture to the output aperture. For solid CPCs, the refractive index at the operating wavelength is considered, as refraction occurs at the input aperture and enlarges the acceptance angle. Photodetector device 450 is positioned at the larger aperture to detect light that enters CPC 400 at the smaller aperture. In some embodiments, photodetector device 450 is bonded directly to the larger aperture of CPC 400. In other embodiments, a dichroic filter element is positioned between photodetector device 450 and CPC 400 to filter the light that reaches photodetector device 450.

Photodetector device 450 may be implemented using any suitable light detecting device. For example, in some embodiments, photodetector device 450 may be implemented by a PIN photodiode, a Silicon photomultiplier (SiPM), or an avalanche photodiode (APD).

Compound parabolic concentrator 400 is shown having four parabolic surfaces, each with a similar parabolic shape, although this is not a limitation of the present invention. For example, in some embodiments, parabolic surfaces 410, 412 have a different parabolic shape than parabolic surfaces 420, 422. Also for example, in some embodiments, more than four parabolic surfaces are included, and in other embodiments, CPC 400 includes a single parabolic surface that is rotationally symmetric.

Figure 5:
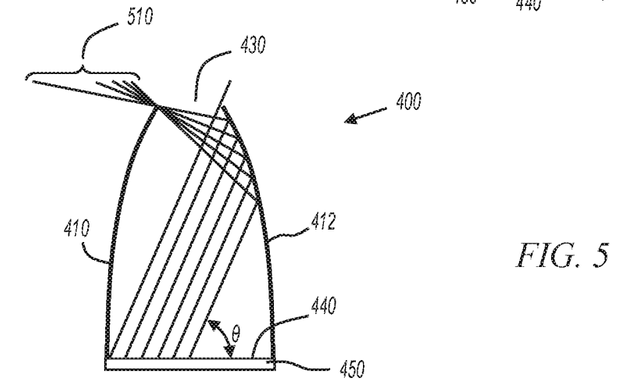
FIG. 5 shows a cross section of the light sensitive apparatus of FIG. 4 in accordance with various embodiments of the present invention.

FIG. 5 shows a cross section of the light sensitive apparatus of FIG. 4 in accordance with various embodiments of the present invention. The cross section of CPC 400 in FIG. 5 shows parabolic sides 410 and 412. Light rays 510 entering first aperture 430, regardless of input angle, reach second aperture 440 at an angle ϕ less than or equal to the acceptance angle $\theta_c$. Accordingly, CPC 400 is oriented such that the light rays that exit the CPC at second aperture 440 have less divergence than light rays 510 that enter the CPC at first aperture 430.

Various embodiments of the present invention advantageously exploit the limited angle of incidence of light rays at second aperture 440 when CPC 400 is oriented as an upside down CPC. For example, in some embodiments, an angularly sensitive device is positioned at the second aperture that takes advantage of the fact that light reaching the second aperture will always have an angle of incidence less than or equal to the acceptance angle $\theta_c$. One example is a dichroic filter. Dichroic filters tend to have a cutoff frequency that is a function of the angle of incident light. By limiting the angle of incident light to a known value, $\theta_c$, an upside down CPC may be used to limit the change in cutoff frequency in dichroic filters.

In some embodiments, a multi-interference (dielectric) dichroic filter is included between the second aperture 440 and photodetector device 450. Multi-interference dichroic filters offer a bandpass with fairly sharp transitions (~10 nm) with high extinction (OD4) in a compact size (on 300 or 500 µm substrates). The combination of upside down CPC and dichroic filter with sharp transitions may be advantageously used to create bandpass filters with reduced bandpass shifts regardless of the angle of incident light reaching the CPC at the first aperture. The combination of upside down CPC and dichroic filter also increases the field of view of the light sensing apparatus, while limiting the angle of incidence on the dichroic filter. In some embodiments, the dichroic filter is built on a separate substrate that is positioned between second aperture 440 and photodetector device 450, and in other embodiments, the dichroic filter is formed by applying dichroic coatings directly on one or both of second aperture and photodetector device 450.

Compound parabolic concentrator 400 is an example of a non-imaging concentrator. As used herein, the term "non-imaging concentrator" refers to any light (visible or nonvisible) energy collecting device that includes first and second apertures of different cross sectional areas, such that when light energy is received at the first aperture, the received light energy (or a portion of the received light energy) is concentrated at the second, smaller, aperture. Many other types of non-imaging concentrators exist. Examples include cone concentrators and parabaloids of revolution. The various embodiments of the present invention may include any type of upside down non-imaging concentrator, and not limited to the upside down CPC.

Figure 6:
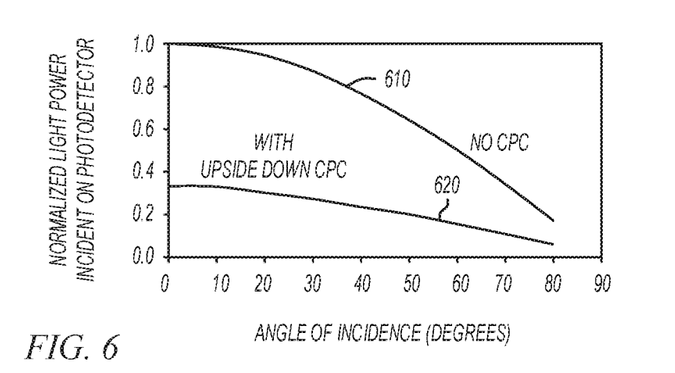
FIG. 6 shows a plot of normalized light power incident on a photodetector after passing through an upside down compound parabolic concentrator in accordance with various embodiments of the present invention.

FIG. 6 shows a plot of normalized light power incident on a photodetector after passing through an upside down compound parabolic concentrator in accordance with various embodiments of the present invention. Curve 610 shows light power incident on a photodetector as a function of angle of incidence with no CPC present. This closely approximates a cos θ response, which is to be expected. Curve 620 shows light power incident on the same size photodetector as a function of angle of incidence on an upside down CPC. The light power incident on the photodetector when used in conjunction with an upside down CPC is only about one third of the light power incident on the photodetector when no CPC is employed.

In some embodiments, the size of the photodetector is increased to regain some of the incident light power. In other embodiments, a second CPC is used to increase the incident light power. These and other embodiments are described below with reference to later figures.

Figures 7, 8:
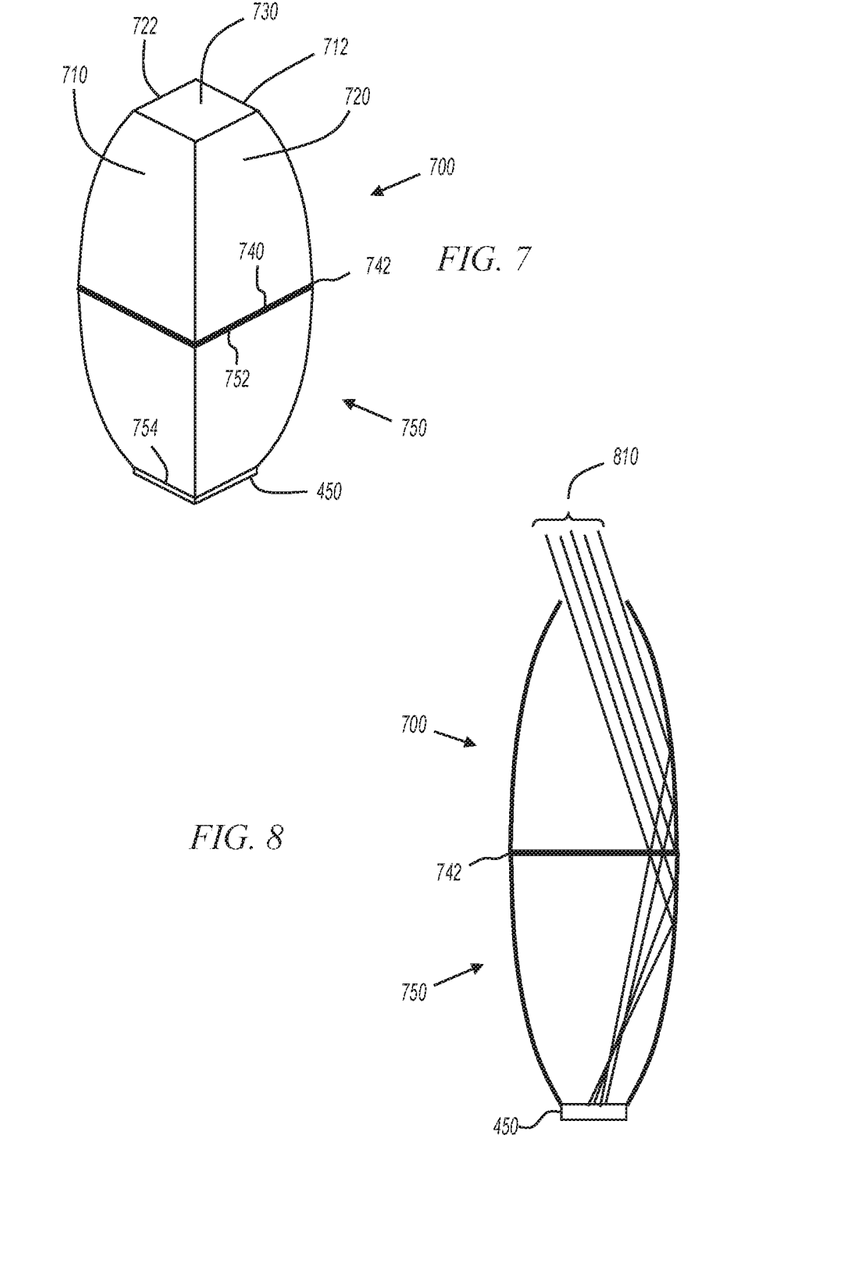
FIG. 7 shows a perspective view of a light sensitive apparatus in accordance with various embodiments of the present invention.
FIG. 8 shows a cross section of the light sensitive apparatus of FIG. 7 in accordance with various embodiments of the present invention.

FIG. 7 shows a perspective view of a light sensitive apparatus in accordance with various embodiments of the present invention. The light sensitive apparatus shown in FIG. 7 includes upside down CPC 700, dichroic filter 742, right side up CPC 750, and photodetector device 450. Upside down CPC 700 is similar to upside down CPC 400 (FIG. 4). Compound parabolic concentrator 700 includes parabolic surfaces 710, 712, and parabolic surfaces 720, 722. Compound parabolic concentrator 700 also includes first aperture 730 and second aperture 740, where first aperture 730 has a smaller cross sectional area than second aperture 740.

Compound parabolic concentrator 700 is referred to herein as "upside down" because it is oriented such that light enters the smaller aperture 730 and exits larger aperture 740. This is in contrast to the "right side up" orientation shown in FIGS. 1-3 where light enters the larger aperture and exits the smaller aperture. In some embodiments, CPC 700 is hollow with reflective sides. In other embodiments, CPC 700 is made of a solid material such as plastic or glass and functions on the principle of total internal reflection (TIR) to guide the light from the input aperture to the output aperture.

Dichroic filter 742 may include one or more dichroic films that filter incident light based on wavelength and angle of incidence. For example, in some embodiments, dichroic filter 742 may include a single dichroic film that passes light below a certain wavelength and reflects light above that wavelength. Also for example, in some embodiments, dichroic filter 742 may include two dichroic films that together form a bandpass or band reject filter.

In some embodiments, dichroic filter 742 may be formed on a substrate that is bonded between CPCs 700 and 750. In other embodiments, dichroic filter 742 may be formed by depositing dichroic coatings directly on the apertures of solid CPCs prior to the CPCs being joined together.

Right side up CPC 750 is positioned between dichroic filter 742 and photodetector device 450. Right side up CPC 750 includes large aperture 752 and small aperture 754. In operation, CPC 750 concentrates light filtered by dichroic filter 742 into a smaller cross sectional area than the dichroic filter (the cross sectional area of smaller aperture 754).

Upside down CPC 700 and right side up CPC 750 may have similar dimensions or different dimensions. For example, upside down CPC 700 may be designed for matching the working angle of the dichroic filter 752, while right side up CPC 750 may be designed to adjust the gain of photodetector device 750 and its angular acceptance. In some embodiments, right side up CPC 750 may be oversized to avoid light leakage from the side when dichroic filter 750 has a nonzero thickness.

FIG. 8 shows a cross section of the light sensitive apparatus of FIG. 7 in accordance with various embodiments of the present invention. As shown in FIG. 8, the input angle of light rays 810 can be up to 180 degrees, while the angle of the light passing through dichroic filter 742 is kept at or below the acceptance angle $\theta_c$ of upside down CPC 700.

For a given size of photodetector device 450, the two CPC light sensing apparatus shown in FIGS. 7 and 8 provides increased light incident on the photodetector than the single upside down CPC light sensing apparatus shown in FIGS. 5 and 6. In some embodiments, the increase in incident light approaches the "no CPC" case shown at 610 (FIG. 6).

Although FIGS. 7 and 8 show right side up and upside down CPCs, the various embodiments of the present invention are not limited in this respect. For example, any type of non-imaging concentrator may be employed without departing from the scope of the present invention.

Figure 9:
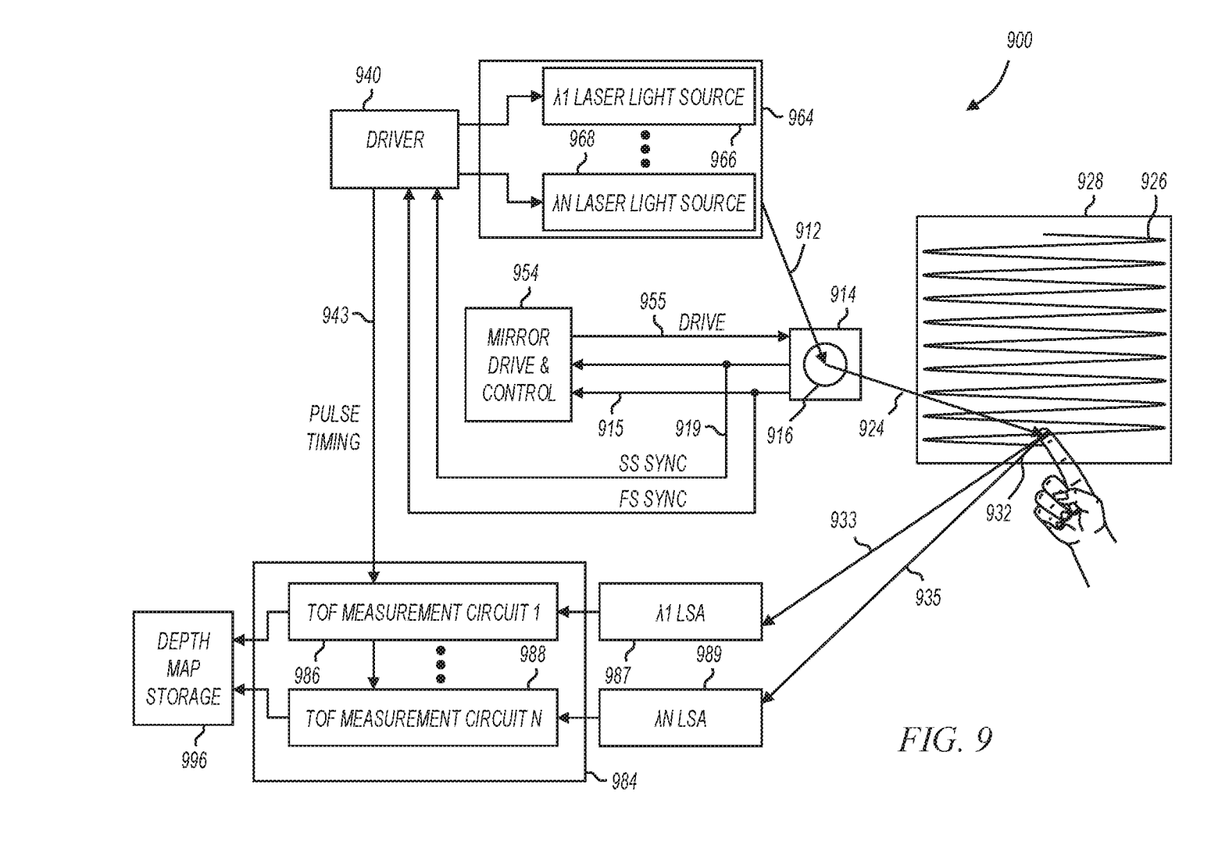
FIG. 9 shows a light detection and ranging system in accordance with various embodiments of the present invention.

FIG. 9 shows a light detection and ranging system in accordance with various embodiments of the present invention. System 900 includes driver circuit 940, laser light sources 964, scanning platform 914 with scanning mirror 916, and mirror drive and control circuit 954. System 900 also includes light sensitive apparatus (LSA) 987, 989, time-of-flight (TOF) measurement circuits 984, and depth map storage 996.

Light sources 964 include multiple light sources capable of emitting laser light of different wavelengths. Light sources 964 shows two light sources, however, any number of light sources at different wavelengths may be included. For example, laser light source 966 emits laser light having a wavelength λ1, and laser light source 968 emits laser light having a wavelength λN, where N is any number. Light sources 964 include optics whose purpose is to combine light beam paths such that light from any of light sources 964 travels on the same or similar collimated path shown as modulated laser beam 912. The beam 912 impinges on a scanning platform 914 which is part of a microelectromechanical system (MEMS) based scanner or the like, and reflects off of scanning mirror 916 to generate a controlled output beam 924.

A scanning mirror drive and control circuit 954 provides one or more drive signal(s) 955 to control the angular motion of scanning mirror 916 to cause output beam 924 to generate a raster scan 926 in a field of view 928. In operation, light sources 964 produce light pulses at multiple different wavelengths and scanning mirror 916 reflects the light pulses as beam 924 traverses raster scan 926.

In some embodiments, raster scan 926 is formed by combining a sinusoidal component on the horizontal axis and a sawtooth component on the vertical axis. In these embodiments, controlled output beam 924 sweeps back and forth left-to-right in a sinusoidal pattern, and sweeps vertically (top-to-bottom) in a sawtooth pattern with the display blanked during flyback (bottom-to-top). FIG. 9 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal. The various embodiments of the present invention are not limited by the waveforms used to control the vertical and horizontal sweep or the resulting raster pattern. The vertical axis is also referred to as the slow scan axis, and the horizontal axis is also referred to as the fast-scan axis. The labels "vertical" and "horizontal" are somewhat arbitrary, since a 90 degree rotation of the apparatus will switch the horizontal and vertical axes. Accordingly, the terms "vertical" and "horizontal" are not meant to be limiting.

Although scanning mirror 916 is shown as a single mirror that scans in two dimensions, this is not a limitation of the present invention. For example, in some embodiments, mirror 916 is replaced by two mirrors, one scanning in one dimension, and a second scanning in a second dimension. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

In some embodiments, scanning mirror 916 includes one or more sensors to detect the angular position or angular extents of the mirror deflection (in one or both dimensions). For example, in some embodiments, scanning platform 914 includes a piezoresistive sensor that delivers a voltage that is proportional to the deflection of the mirror on the fast-scan axis. Further, in some embodiments, scanning platform 914 includes an additional piezoresistive sensor that delivers a voltage that is proportional to the deflection of the mirror on the slow-scan axis. The mirror position information is provided back to mirror drive and control circuit 954 as the slow scan (SS) sync signal 919 and the fast scan (FS) sync signal 915. In these embodiments, mirror drive and control circuit 954 includes one or more feedback loops to modify the drive signals in response to the measured angular deflection of the mirror.

Mirror drive and control circuit 954 is implemented using functional circuits such as phase lock loops (PLLs), filters, adders, multipliers, registers, processors, memory, and the like. Accordingly, mirror drive and control circuit 954 may be implemented in hardware, software, or in any combination. For example, in some embodiments, control circuit 954 is implemented in an application specific integrated circuit (ASIC). Further, in some embodiments, some of the faster data path control is performed in an ASIC and overall control is software programmable.

In operation, laser light pulses of different wavelengths may be reflected by an object 932 in the field of view 928. Light sensitive apparatus 987 detects light reflections 933 having wavelength λ1, and light sensitive apparatus 989 detects light reflections 935 having wavelength λN. Light sensitive apparatus 987 and 989 may include any of the light sensitive apparatus embodiments described herein. For example, light sensitive apparatus 987 and 989 may include any of the light sensitive apparatus shown in FIG. 4, 5, 7, or 8. Light sensitive apparatus 987 and 989 provide indications of detected light to time-of-flight measurement circuits 986 and 988.

Time-of-flight (TOF) measurement circuits 986 and 988 receive laser light pulse timing information 943 from driver circuit 940 and compares it to the timing of received laser light pulses to measure round trip times-of-flight of light pulses, thereby measuring the distance (Z) to the point in the field of view 928 from which the laser light pulse was reflected.

TOF measurement circuits 984 include multiple measurement circuits capable of measuring times-of-flight of light pulses of different wavelengths. TOF measurement circuits 984 shows two measurement circuits, however, any number of circuits capable of measuring TOFs of light at different wavelengths may be included. For example, TOF measurement circuit 986 measures the TOF of laser light pulses having a wavelength λ1, and TOF measurement circuit 988 measures the TOF of laser light pulses having a wavelength λN, where N is any number. TOF measurement circuits may be implemented with any suitable circuit elements. For example, in some embodiments, TOF measurement circuits 986 and 988 include digital and/or analog timers, integrators, correlators, comparators, registers, adders, or the like to compare the timing of the reflected laser light pulses with the pulse timing information received from driver circuit 940.

In some embodiments, light sources 964 source nonvisible light such as infrared (IR) light. In these embodiments, detector devices 987 and 989 are able to detect respective wavelengths of nonvisible light. For example, in some embodiments, light source 966 may include a laser diode that produces infrared light with a wavelength of substantially 850 nanometers (nm), and detector device 987 detects reflected light pulses with a wavelength of substantially 850 nm. Also for example, in some embodiments, light source 968 may include a laser diode that produces infrared light with a wavelength of substantially 900 nanometers (nm), and detector device 989 detects reflected light pulses with a wavelength of substantially 900 nm. The wavelength of light is not a limitation of the present invention. Any wavelength, visible or nonvisible, may be used without departing from the scope of the present invention.

The light sensitive apparatus of the present invention allows light sources and detectors to be closely spaced in wavelength. The use of upside down CPCs to limit the angle of incidence on dichroic filters controls any wavelength shift that would otherwise occur due to angles of incidence greater than the acceptance angle.

As shown in FIG. 9, the number of wavelengths detected by the detector devices, N, matches the number of wavelengths sourced by the laser light sources. Any number of light sources, and any number of detector devices and corresponding TOF measurement circuits may be included without departing from the scope of the present invention.

Depth map storage 996 receives TOF information corresponding to distance (Z) information from TOF measurement circuits 984. In some embodiments, the TOF measurements are held in depth map storage 996 in an array format such that the location within depth map storage indicates the location within the field of view from which the measurement was taken. In other embodiments, the TOF measurements held in depth map storage 996 include (X,Y) position information as well as TOF measurement information to yield (X,Y,Z) as a three dimensional (3D) data set that represents a depth map of the measured portion of the field of view 928. The depth map data may then be used for any suitable purpose. Examples include 3D imaging, gesture recognition, and the like.

Depth map storage 996 may be implemented using any suitable circuit structure. For example, in some embodiments, depth map storage 996 is implemented in a dual port memory device that can be written on one port and read on a second port. In other embodiments, depth map storage 996 is implemented as data structures in a general purpose memory device. In still further embodiments, depth map storage 996 is implemented in an application specific integrated circuit (ASIC).

Driver circuit 940 controls the generation of laser light pulses and causes them to be generated at times that spatially place the pulses in a desired pattern within the field of view. For example, driver circuit 940 may control the timing of laser light pulses such that laser light pulses of different wavelengths are directed to similar or identical locations within the field of view. Also for example, driver circuit 940 may control the timing of laser light pulses such that laser light pulses of different wavelengths are interleaved in space. In some embodiments, driver circuit 940 may control the timing of laser light pulses such that laser light pulses of different wavelengths are scanned in different regions of the field of view. For examples, pulses of a first wavelength may be placed in the center of the field of view, pulses of a second wavelength may be placed to the left of center of the field of view and pulses of a third wavelength may be placed to the right of center of the field of view.

Figure 10:
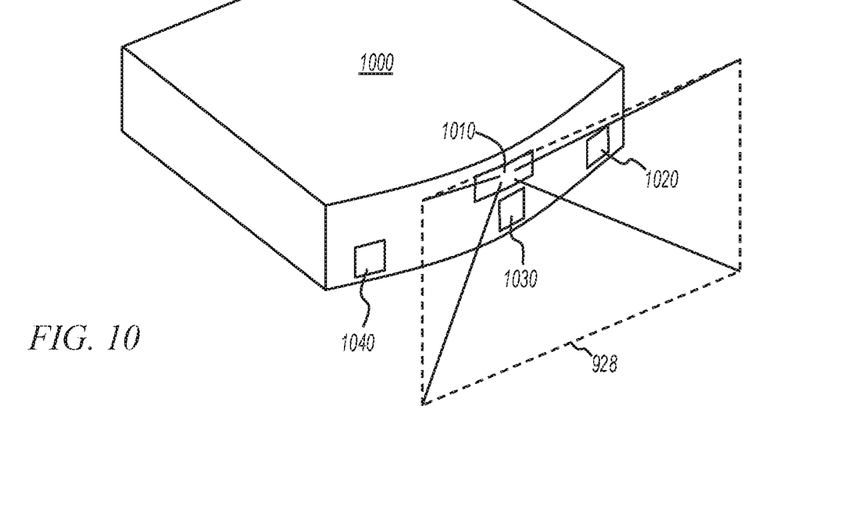
FIG. 10 shows a perspective view of a light detection and ranging system in accordance with various embodiments of the present invention.

FIG. 10 shows a perspective view of a scanning light detection and ranging system in accordance with various embodiments of the present invention. Scanning light detection and ranging (LIDAR) system 1000 includes a scanner 1010 and three light sensing apparatus 1020, 1030, and 1040. In operation, LIDAR system 1000 scans laser light pulses of different wavelengths in a field of view 928, and light sensing apparatus 1020, 1030, and 1040 are used to detect laser light reflections from points within the field of view 928 to determine the distance (range) to the reflection points.

Light sensitive apparatus 1020, 1030, and 1040 may include any of the light sensitive apparatus embodiments described herein. For example, light sensitive apparatus 1020, 1030, and 1040 may include any of the light sensitive apparatus shown in FIG. 4, 5, 7, or 8.

Figure 11:
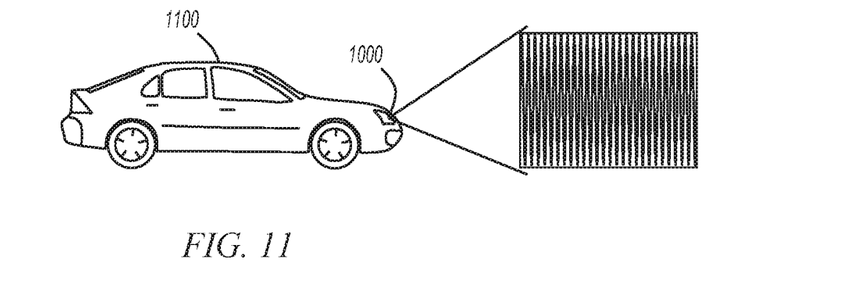
FIG. 11 shows an automotive application of the scanning light detection and ranging system of FIG. 10 in accordance with various embodiments of the present invention.

FIG. 11 shows an automotive application of the scanning light detection and ranging system of FIG. 10 in accordance with various embodiments of the present invention. As shown in FIG. 11, vehicle 1100 includes LIDAR system 1000 at the front of the vehicle. LIDAR system 1000 may be any LIDAR system with one or more upside down compound parabolic concentrators as described herein. In some embodiments, the horizontal angular extents of LIDAR system 1000 may be substantially equal to 90 degrees. In other embodiments, the horizontal angular extents may be greater, such as 120 degrees, or 180 degrees.

Figure 12:
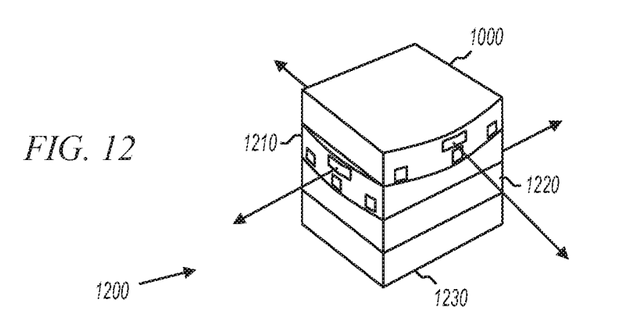
FIG. 12 shows a light detection and ranging system that includes multiple scanning light detection and ranging modules in accordance with various embodiments of the present invention.

FIG. 12 shows a light detection and ranging system that includes multiple scanning light detection and ranging modules in accordance with various embodiments of the present invention. Scanning LIDAR system 1200 includes four identical scanning LIDAR modules 1000, 1210, 1220, and 1230. Each scanning LIDAR module has horizontal angular extents of substantially 90 degrees, and each if offset by 90 degrees to provide an effective angular extents of 360 degrees. In some of the embodiments represented by FIG. 12, one of the scanning LIDAR modules operates as a master and the remaining LIDAR modules operate as slaves that are phase locked to the first scanning LIDAR module, and in other embodiments, all of the scanning LIDAR modules operate as slaves and are phase locked to an external sync signal.

In some embodiments, fewer than four LIDAR modules are included in LIDAR system 1200. For example, some embodiments include three LIDAR modules, each with angular extents of substantially 120 degrees, and other embodiments include two LIDAR modules, each with angular extents of substantially 180 degrees.

Figure 13:
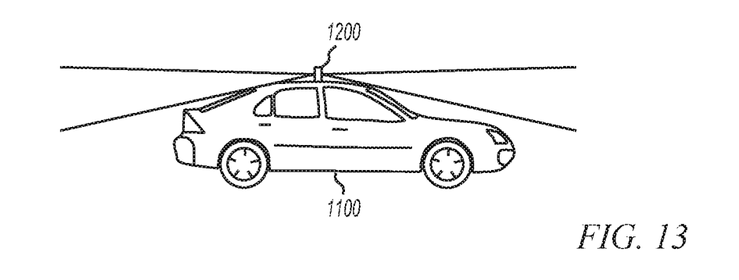
FIG. 13 shows an automotive application of the scanning light detection and ranging system of FIG. 12 in accordance with various embodiments of the present invention.

FIG. 13 shows an automotive application of the scanning light detection and ranging system of FIG. 12 in accordance with various embodiments of the present invention. As shown in FIG. 13, vehicle 1100 includes LIDAR system 1200 located on the vehicle such that LIDAR system 1200 has an effective angular extents of 360 degrees.

Figure 14:
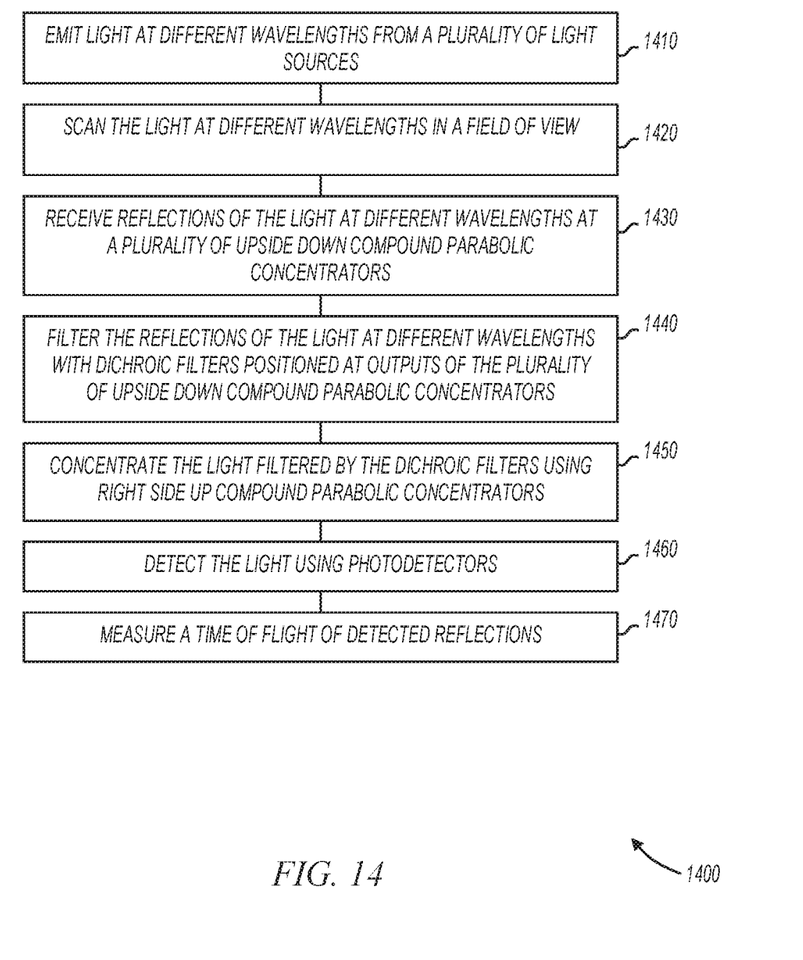
FIG. 14 shows a flow diagram of methods in accordance with various embodiments of the present invention.

FIG. 14 shows a flow diagram of methods in accordance with various embodiments of the present invention. In some embodiments, method 1400, or portions thereof, is performed by a scanning LIDAR system or a scanning LIDAR module. In other embodiments, method 1400 is performed by a series of circuits or an electronic system. Method 1400 is not limited by the particular type of apparatus performing the method. The various actions in method 1400 may be performed in the order presented, or may be performed in a different order. Further, in some embodiments, some actions listed in FIG. 14 are omitted from method 1400.

Method 1400 is shown beginning with block 1410 where light at different wavelengths is emitted from a plurality of light sources. In some embodiments, this includes laser light pulses at different IR wavelengths. The different IR wavelengths may be closely spaced (e.g., 50-100 nm).

At 1420, the light from the light sources is scanned in a field of view. The scanning may be performed by a single mirror or multiple mirrors (FIG. 9) or a non-mirror scanning mechanism.

At 1430, reflections of the light at different wavelengths are received at a plurality of upside down non-imaging concentrators, such as compound parabolic concentrators. As described above, the upside down parabolic concentrators provide a wide field of view for collecting light at the different wavelength.

At 1440, the reflections of light at different wavelength are filtered with dichroic filters positioned at outputs of the upside down compound parabolic concentrators. The bandpass shift resulting from angle of incidence variations on the dichroic filters is controlled by the upside down compound parabolic concentrators which limit the angle of incidence on the dichroic filters to the acceptance angle of the upside down compound parabolic concentrators.

At 1450, the light filtered by the dichroic filters is concentrated using right side up non-imaging concentrators such as compound parabolic concentrators. This is shown in FIGS. 7 and 8 where light passing through the dichroic filter is concentrated into the cross sectional area of the smaller aperture.

At 1460, the light reaching the smaller aperture of the right side up compound parabolic concentrator is detected using a photodetector. This corresponds to photodetector 450 (FIGS. 7, 8) detecting light.

At 1470 times-of-flight of the detected light reflections are measured. This corresponds to the operation of the various TOF measurement circuits described above.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A light detection and ranging system comprising:
   a plurality of light sources to emit laser light pulses at different wavelengths;
   a scanning mirror positioned to reflect the laser light pulses light from the plurality of laser light sources into a field of view; and
   at least one light sensing apparatus to receive reflections of the laser light pulses, each of the at least one light sensing apparatus including a non-imaging concentrator having first and second apertures, and a plurality of dichroic filters positioned at the second aperture to filter light at the different wavelengths that enters the non-imaging concentrator at the first aperture;
   wherein the non-imaging concentrator is oriented such that light rays that exit the non-imaging concentrator at the second aperture have less divergence than light rays that enter the non-imaging concentrator at the first aperture.

2. The light detection and ranging system of claim 1 wherein each of the at least one light sensing apparatus further includes a photodetector positioned at the second aperture to detect light filtered by the dichroic filter.

3. The light detection and ranging system of claim 1 wherein the non-imaging concentrator comprises a compound parabolic concentrator.

4. The light detection and ranging system of claim 1 wherein each of the at least one light sensing apparatus further includes a second non-imaging concentrator positioned to concentrate light filtered by the dichroic filter into a smaller cross-sectional area than the dichroic filter.

5. The light detection and ranging system of claim 4 wherein the non-imaging concentrator comprises a compound parabolic concentrator and the second non-imaging concentrator comprises a compound parabolic concentrator.

6. The light detection and ranging system of claim 4 wherein each of the at least one light sensing apparatus further includes a photodetector coupled to the second non-imaging concentrator to detect light in the smaller cross-sectional area.

7. The light detection and ranging system of claim 1 wherein the plurality of dichroic filters comprises a bandpass filter.

8. The light detection and ranging system of claim 1 further comprising at least one time-of-flight (TOF) detection circuit coupled to the at least one light sensing apparatus to measure TOF of received laser light pulses at the different wavelengths.

9. The light detection and ranging system of claim 8 wherein the plurality of laser light sources emit infrared light at different wavelengths.

10. A method comprising:
    emitting light pulses at different wavelengths from a plurality of laser light sources;
    scanning the light pulses light from the plurality of laser light sources into a field of view with at least one scanning mirror;
    receiving reflections of the laser light pulses at different wavelengths at a plurality of upside down compound parabolic concentrators;
    filtering the reflections of the laser light pulses at different wavelengths with dichroic filters positioned at outputs of the plurality of upside down compound parabolic concentrators;
    detecting the reflections of the laser light pulses exiting the dichroic filters; and
    measuring a time-of-flight (TOF) of the detected reflections of the laser light pulses.

11. The method of claim 10 further comprising concentrating the light filtered by the dichroic filters using right side up compound parabolic concentrators.

\* \* \* \* \*